United States Patent
Brück

(10) Patent No.: US 7,547,331 B2
(45) Date of Patent: Jun. 16, 2009

(54) REFORMER INSTALLATION WITH HEAT SHIELD

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 890 days.

(21) Appl. No.: 10/457,729

(22) Filed: Jun. 9, 2003

(65) Prior Publication Data

US 2004/0033174 A1  Feb. 19, 2004

Related U.S. Application Data

(63) Continuation of application No. PCT/EP01/14416, filed on Dec. 7, 2001.

(30) Foreign Application Priority Data

Dec. 8, 2000  (DE) .............................. 100 61 084

(51) Int. Cl.
  *B01J 8/00* (2006.01)
(52) U.S. Cl. .................. 48/61; 48/127.9; 165/136; 429/19; 429/20
(58) Field of Classification Search .......... 422/180, 422/179, 175, 211, 222, 221; 252/62; 106/122; 220/592.2; 126/375.1
See application file for complete search history.

(56) References Cited

U.S. PATENT DOCUMENTS 3,775,064 A  11/1973 Berger et al.
3,958,951 A  5/1976 Woebcke et al.
4,340,501 A  7/1982 Davidson (Continued)

FOREIGN PATENT DOCUMENTS

DE  2 046 324  3/1972

(Continued)

OTHER PUBLICATIONS

Author not listed: "Thermische Eigenschaften der Technischen Keramik" [Thermal Characteristics of Technical Ceramic], www.keramverband.de, Informationszentrum Technische Keramik, Jan. 1, 1998, two pages.

(Continued)

*Primary Examiner*—Alexa D. Neckel
*Assistant Examiner*—Kaity V. Handal
(74) *Attorney, Agent, or Firm*—Laurence A. Greenberg; Werner H. Stemer; Ralph E. Locher

(57) ABSTRACT

A reformer installation for generating a hydrogen-rich product gas from a hydrocarbon-containing fluid, includes a housing having an interior, at least one reformer zone disposed in the interior of the housing and at least one feed line leading to the housing. A thermally insulating heat shield causes a reduction of an operating temperature in the at least one reformer zone by 50% to take at least 8 hours and preferably causes a reduction of the operating temperature in the at least one reformer zone by 20% to take at least 8 hours. This improves the cold start performance of the reformer installation, since the reformer installation is prevented from cooling off too quickly. That is particularly advantageous for the use of reformer installations of this type in automobile construction, since those kinds of reformer installations are activated again and again at certain intervals.

23 Claims, 1 Drawing Sheet

U.S. PATENT DOCUMENTS

| | | | |
|---|---|---|---|
| 4,844,837 A | | 7/1989 | Heck et al. |
| 4,921,680 A | | 5/1990 | Bonk et al. |
| 5,695,722 A | * | 12/1997 | Myers et al. ............... 422/174 |
| 5,834,108 A | * | 11/1998 | Shimai et al. ............ 428/307.3 |
| 6,187,066 B1 | | 2/2001 | Benz et al. |
| 6,203,764 B1 | * | 3/2001 | Benson ...................... 422/179 |
| 6,241,792 B1 | | 6/2001 | Schuessler et al. |
| 6,268,075 B1 | | 7/2001 | Autenrieth et al. |
| 6,294,149 B1 | | 9/2001 | Autenrieth et al. |
| 6,383,468 B1 | | 5/2002 | Schüssler et al. |
| 6,390,030 B1 | * | 5/2002 | Isogawa et al. ................ 123/3 |
| 2002/0054837 A1 | * | 5/2002 | Abe et al. ................... 422/174 |

FOREIGN PATENT DOCUMENTS

| | | |
|---|---|---|
| DE | 25 13 499 A1 | 10/1975 |
| DE | 42 30 583 A1 | 3/1994 |
| DE | 43 07 217 C2 | 9/1994 |
| DE | 196 39 150 A1 | 4/1998 |
| DE | 197 27 588 C1 | 2/1999 |
| DE | 197 55 813 A1 | 7/1999 |
| DE | 197 55 815 A1 | 7/1999 |
| DE | 197 55 814 C1 | 11/1999 |
| DE | 199 09 935 A1 | 9/2000 |
| EP | 0 350 033 A2 | 1/1990 |
| EP | 0 600 621 A1 | 6/1994 |
| EP | 0 967 174 A1 | 12/1999 |

OTHER PUBLICATIONS

Author not listed: "Technische Daten" [Technical Data], www.rhv-technik.de/tdaten.html, RHV Technik, two pages.
Bockhorst, M.: "Wärmeleitfähigkeit" [Thermal Conductivity], www.energieinfo.de, one page.
Author not listed: "Wärmespeichermaterialien" [Thermal Accumulator Materials], www.rubitherm.de, two pages.
Author not listed: "Wärmeleitfähigkeit W/mK" [Thermal Conductivity], www.tece-selb.de, one page.

* cited by examiner

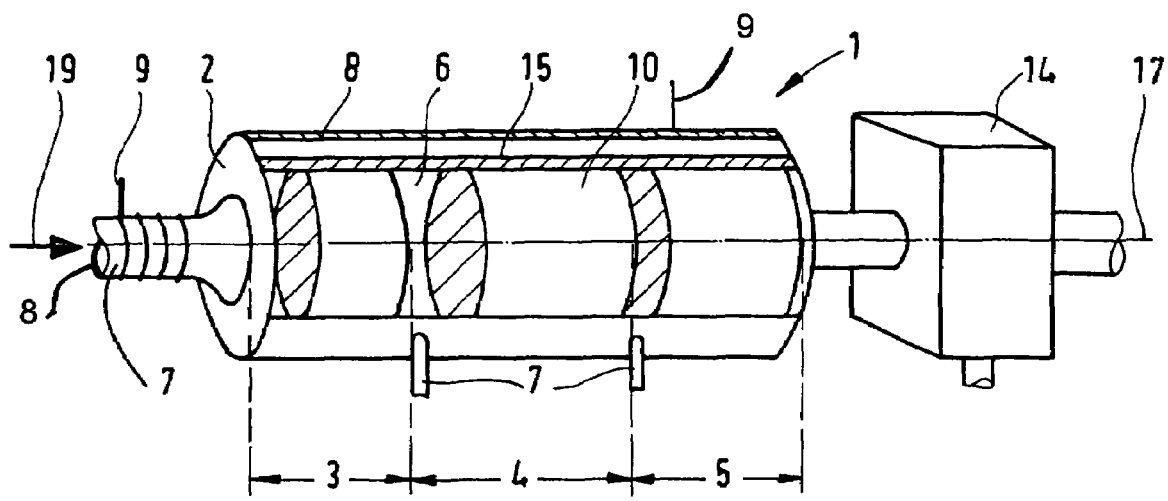
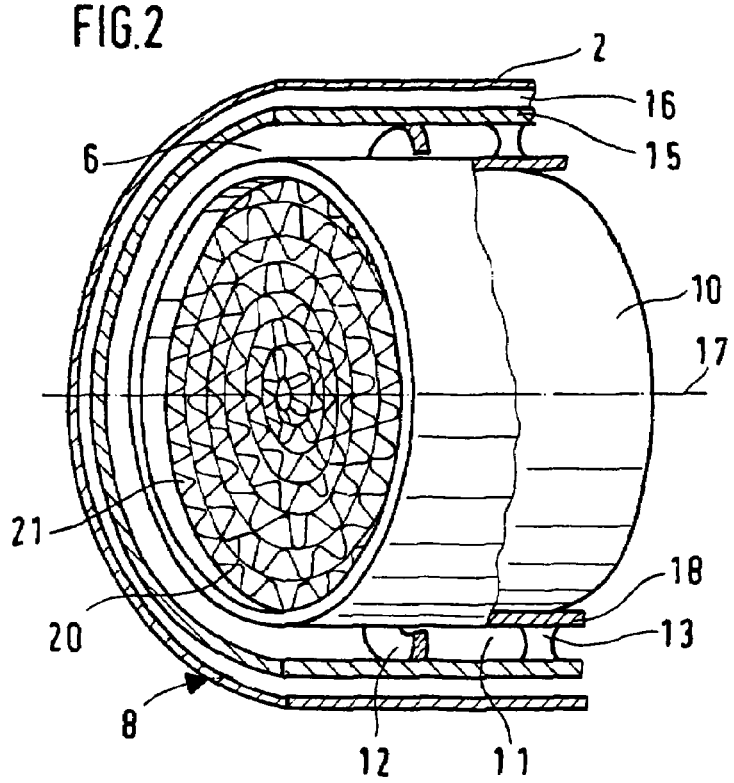

REFORMER INSTALLATION WITH HEAT SHIELD

CROSS-REFERENCE TO RELATED APPLICATION

This application is a continuation of copending International Application No. PCT/EP-01/14416, filed Dec. 7, 2001, which designated the United States and was not published in English.

BACKGROUND OF THE INVENTION

Field of the Invention

The invention relates to a reformer installation for generating a hydrogen-rich product gas from a hydrocarbon-containing fluid. The reformer installation includes a housing having at least one reformer zone, which is disposed in an interior of the housing, and at least one feed line. A reformer installation of that type is used, for example, to provide hydrogen for operating a fuel cell in the automotive industry.

Fuel cells for supplying energy to electrically driven motor vehicles are currently the subject of intensive research work. The fuel for the fuel cell is hydrogen. The question arises, especially for use in mobile applications, as to whether the hydrogen should be carried along and used directly in the vehicle or whether it should be stored in an indirect form in what are known as hydrogen carriers such as, for example, methanol, gasoline, diesel fuel, etc., and only converted into hydrogen in the vehicle itself. Since there currently is no suitable infrastructure for refueling motor vehicles with liquid hydrogen and since the storage of the hydrogen also presents problems, the reforming of hydrocarbons to obtain hydrogen on board the motor vehicle is currently preferred.

The term reforming is used to cover a range of processes for the production of hydrogen-rich gases, known as reformates. The use of catalysts in the reformer allows the process to be accelerated and to be controlled better. The most important catalytic processes are explained briefly below.

Steam reforming is the most widespread process among the possible options for the reforming of hydrocarbons. In that process, steam, due to its oxygen content, on one hand acts as an oxidizing agent in order to separate the hydrogen contained in the fuel from the carbon, and on the other hand also makes a contribution to the hydrogen production itself. Therefore, the highest yields of hydrogen of all reforming processes are achieved for pure steam reforming processes, even at a low temperature level. Steam reforming reactions are highly endothermic and therefore require external heat sources.

A further process is what is known as partial oxidation. In partial oxidation, oxygen or air is added to the evaporated hydrocarbon as an oxidizing agent. That gives rise to a strongly exothermic oxidation reaction which produces excess heat and therefore does not require any external heat source, unlike steam reforming. However, the hydrogen content produced in the product gas being formed is lower, (approximately 50% hydrogen), and the carbon monoxide content is higher (approximately 3 to 4%).

A combination of steam reforming and partial oxidation is known as autothermal reforming. In that process, the addition of steam and oxygen or air are set in such a way that the heat which is generated by the exothermic partial oxidation reaction just covers the heat requirement of the endothermic reforming. The hydrogen content of the product gas being formed is lower than with steam reforming and higher than with partial oxidation. The combination of the two processes can lead to a rapid start-up and load-change performance.

If one considers the use of reformer installations of that type in mobile applications such as, for example, in a motor vehicle, the start-up time of the reformer installation is of particular importance. From the start until the time at which the operating temperature (approximately 400° Celsius) is reached, known reformer installations require a warm-up phase which lasts for a period of from 1 minute to 3 minutes.

SUMMARY OF THE INVENTION

It is accordingly an object of the invention to provide a reformer installation with a heat shield, which overcomes the hereinafore-mentioned disadvantages of the heretofore-known devices of this general type and which has a significantly improved start-up and load-change performance.

With the foregoing and other objects in view there is provided, in accordance with the invention, a reformer installation for generating a hydrogen-rich product gas from a hydrocarbon-containing fluid. The reformer installation comprises a housing having an interior. At least one reformer zone is disposed in the interior of the housing and has an operating temperature. At least one feed line leads to the housing. A thermally insulating heat shield causes a reduction of the operating temperature in the at least one reformer zone by 50% to take or last at least 8 hours, and preferably causes a reduction of the operating temperature in the at least one reformer zone by 20% to take or last at least 8 hours.

A reformer installation of this type is particularly suitable for operation of a fuel cell in a motor vehicle. In this case, the heat shield has the objective of slowing or preventing the cooling of the reformer installation after operation. The result of this is that when the reformer installation is restarted, the residual temperature in the interior of the reformer installation is, for example, significantly higher than ambient temperature. Since, after the reformer installation has been started up again, it is now necessary to cover a reduced temperature range before the operating temperature is reached, the starting time can be shortened significantly. Furthermore, if one considers the driving characteristic of commuters who drive to work, a time of eight hours is particularly advantageous in terms of heat retention, since this often corresponds to the duration of a working day.

In accordance with another feature of the invention, the heat shield is constructed in such a way that it takes at least 24 hours for the operating temperature in the at least one reformer zone to drop by 50%, in particular that it takes at least 24 hours for the operating temperature in the at least one reformer zone to drop by 20%. A heat shield of this type ensures that there is sufficient residual heat in the interior of the reformer installation even after a prolonged shutdown or after a long period of not being started, so that very short starting times can be achieved. The retention of heat in the reformer represents a new method for shortening the starting time. While known reformers are provided with active heating devices which supply generally externally obtained heat after the start-up, the reformer according to the invention is particularly suitable for storing heat which is obtained as part of the reforming. This significantly reduces the energy consumption and therefore increases the efficiency of the reformer installation.

In accordance with a further feature of the invention, the heat shield has a thermal conductivity of less than 35 W/mK [watt/(meter Kelvin)]. The thermal conductivity describes the ability of a material to conduct heat. In order to at least significantly reduce a flux of heat out of the interior of the reformer installation, for example outward into the environment, it is advantageous for the heat shield to be constructed with a relatively low thermal conductivity. Depending on the requirements with regard to thermal insulation, the heat shield may advantageously have a thermal conductivity of less than 12 W/mK, in particular even less than 5 W/mK. Therefore, the heat shield has, for example, a significantly lower thermal conductivity than unalloyed steel (55 W/mK). In order to achieve a thermal conductivity of this level it is possible, for example, to use coatings or alloys of alumina oxide (28 W/mK), nickel-chromium (14 W/mK), zirconium oxide (2 W/mK) or porcelain (6 W/mK).

In accordance with an added feature of the invention, the heat shield has an associated heat storage device or accumulator, which is preferably constructed with a phase change material (PCM) and in particular is disposed within the heat shield. The phase change material is distinguished by the fact that a phase change takes place in a temperature range between 250° Celsius and 650° Celsius, preferably between 300° Celsius and 500° Celsius. This temperature range is close to the operating temperature of the reformer installation. A phase change material which is distinguished by a phase change from solid to liquid or liquid to solid is particularly suitable in this context. These phase change materials are particularly suitable for acting as high-temperature heat storage devices or accumulators. During the normal operation of the reformer installation, a heat storage device or accumulator constructed in this manner can take up a very large amount of thermal energy, which it releases again to the reformer installation as it cools. In this context, it is particularly advantageous for the phase change material to be selected in such a way that the phase change temperature lies in a temperature range which corresponds to the operating temperature of the reformer installation. With a view to achieving an increased level of safety, it may also be advantageous to construct the heat storage device or accumulator with a solid/solid phase change material. With this material, the phase change is to be understood as meaning a reordering of the lattice structure.

This phase change material is in a solid state of aggregation at any operating time of the reformer installation.

In accordance with an additional feature of the invention, the heat shield is constructed with a vacuum. A vacuum between the reformer installation and the colder surroundings represents a very good thermal insulator.

In accordance with yet another feature of the invention, there is provided a plurality of reformer zones, the heat shield having different thermal conductivities at the individual reformer zones. In this way it is possible, for example, to prevent overheating from occurring in particular in the reformer zones in which an exothermic reaction takes place. Consequently, the heat shield can be matched to the structure of the reformer installation.

In accordance with yet a further feature of the invention, a first reformer zone of the reformer installation is used for partial oxidation, a second reformer zone is used for steam reforming of a hydrocarbon-containing fluid, and the heat shield in the second reformer zone is constructed with a lower thermal conductivity than the heat shield of the first reformer zone. As has already been mentioned above, it is mainly exothermic reactions which take place during the partial oxidation, during which from time to time very large amounts of thermal energy are released. Moreover, these reactions proceed automatically after only a very small amount of activation energy has been added (such as, for example, by ignition of the hydrocarbon mixture using a burner). Since the downstream steam reforming takes place endothermically, the object of the heat shield in the first reformer zone is firstly to prevent the first reformer zone from overheating but secondly also to ensure a sufficient supply of heat to the second reformer zone through the use of partial oxidation. Since a very large amount of thermal energy is required in the second reformer zone, it is highly advantageous for a heat shield with a very low thermal conductivity to be disposed in this zone.

In accordance with yet an added feature of the invention, a third reformer zone is used to purify the fluid which has already been reformed, in particular through the use of a catalyst, and the heat shield of the third reformer zone is constructed with a higher thermal conductivity than that of the second reformer zone. The heat shield of the third reformer zone preferably has a lower thermal conductivity than the heat shield of the first reformer zone. During the purification of the product gas, it is particularly important to reduce the carbon monoxide content of the product gas stream. For this purpose, what is known as the shift reaction or carbon monoxide conversion is used in many cases. These reactions take place exothermically, with the maximum conversion rates or conversion speeds which can be achieved being highly temperature-dependent. In these reactions, steam is fed to the carbon monoxide-containing product gas. The carbon monoxide which is present in the reformate is converted into carbon dioxide and the steam is converted into hydrogen. Suitable temperatures in this case lie in a range of from approximately 180° to 280° Celsius.

With regard to precise setting of the temperature level within the reformer installation, it may be necessary for the individual reformer zones also to be constructed with different heat storage devices or accumulators (for example different heat capacities) and/or with a further subdivision of the individual reformer zones with regard to different heat shields or heat storage devices.

In accordance with yet an additional feature of the invention, the heat shield has an associated electric heater. This may, for example, be disposed outside the heat shield, in order to reduce the temperature difference between the interior and the outside surroundings of the heat shield and in this manner to additionally slow cooling of the reformer installation. If the electric heater is disposed inside the heat shield, it is also used, for example, for rapid heating of the reformer installation after it has started up.

In accordance with again another feature of the invention, the at least one feed line likewise has a heat shield which is constructed in particular with a heat storage device that is preferably filled with a phase change material. In this way, it is possible to ensure that the steam required in the reformer installation, in particular during the starting phase, does not condense again in the feed lines. In this case, it is particularly advantageous for the at least one feed line to have an electric heater, and in this case too it is possible to prevent rapid cooling.

In accordance with again a further feature of the invention, the interior of the housing has at least one honeycomb body which is thermally decoupled from the housing. The honeycomb body in this case likewise represents a type of heat storage device or accumulator with a pre-determinable heat capacity. The thermal decoupling prevents rapid cooling of the honeycomb body with respect to the housing and/or in the flow direction.

In accordance with again an added feature of the invention, the honeycomb body is at least partially surrounded by an air gap, into which preferably at least one convection barrier extends. The air gap serves as thermal insulation with respect to the housing. In order to particularly effectively prevent rapid cooling, it is preferable for convection barriers which minimize swirling of gas streams after the reformer installation has been switched off to be disposed in the air gap.

In accordance with a concomitant feature of the invention, the at least one honeycomb body has at least one hanging or suspension device, which is formed at least in part of ceramic material. In this way, the honeycomb body is axially fixed in the reformer installation and, due to the low thermal conductivity of the ceramic, a heat flux from the honeycomb body to the housing through the hanging device is significantly impeded.

Other features which are considered as characteristic for the invention are set forth in the appended claims.

Although the invention is illustrated and described herein as embodied in a reformer installation with a heat shield, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, perspective view of an embodiment of a reformer installation according to the invention; and FIG. 2 is a partly broken-away and partly sectional perspective view of a further embodiment of the reformer installation according to the invention, having a honeycomb body.

DESCRIPTION OF THE PREFERRED EMBODIMENTS

Referring now to the figures of the drawings in detail and first, particularly, to FIG. 1 thereof, there is seen a diagrammatic and perspective illustration of a reformer installation 1 for generating a hydrogen-rich product gas from a hydrocarbon-containing fluid. The reformer installation 1 includes a housing 2 having first, second and third reformer zones 3, 4, 5 which are disposed in an interior 6 of the housing. In order to provide thermal insulation, the reformer installation 1 has a heat shield 8 which is constructed in such a manner that it takes at least 8 hours for the operating temperature in the reformer zones 3, 4, 5 to drop by 50%, and that it preferably takes at least 8 hours for the operating temperature in the reformer zones 3, 4, 5 to drop by 20%. The heat shield 8 is additionally constructed with a heat accumulator or heat storage device 15, which is preferably made from a phase change material. The first reformer zone 3 is used in this case for partial oxidation, the second reformer zone 4 for steam reforming of the hydrocarbon-containing fluid and the third reformer zone 5 for catalytic purification of the product gas. Each reformer zone 3, 4, 5 has a honeycomb body 10, so that the fluid which is to be reformed flows through this honeycomb body 10 in a flow direction 19. The heat shield has a higher thermal conductivity in the third reformer zone 5 than in the second reformer zone 4 and the heat shield 8 has a lower thermal conductivity in the third reformer zone 5 than in the first reformer zone 3. Alternatively, different heat shields may be provided in the different zones to provide the thermal conductivities mentioned above.

The housing 2 has a feed line 7, which is disposed along an extension of an axis 17, through which the hydrocarbon-containing fluid can be introduced into the reformer installation 1. The feed line 7 has an electric heater 9 which, by way of example, is provided to prevent rapid cooling. The heat shield 8 also has an electric heater 9. Two further feed lines 7 are respectively disposed at a start of the second reformer zone 4 and the third reformer zone 5, as seen in the flow direction 19. The further feed lines 7 are used, for example, to supply steam or an oxygen-containing gas for reforming or oxidizing the hydrocarbon-containing fluid. The feed lines 7 may also have heat shields, preferably with heat storage devices or accumulators, in a manner similar to elements 8 and 15.

A fuel cell 14, to which the hydrogen-rich product gas is supplied, is disposed downstream of the reformer installation 1, as seen in the flow direction 19. The fuel cell 14 is used, in particular, to drive an electric motor vehicle. Exhaust gas produced in the process is discharged to the environment, if appropriate following a further purification stage.

FIG. 2 diagrammatically depicts a sectional view through the housing 2. In the housing 2, there is a honeycomb body 10 which is surrounded by a tubular jacket 18. In this case, the honeycomb body 10 is constructed with metal sheets 20 which form passages 21 running parallel to the axis 17. It is also possible to construct the honeycomb body 10 with a ceramic support structure. The honeycomb body 10 is disposed in the interior 6 of the housing 2 and is thermally decoupled from the housing 2. For example, the honeycomb body 10 is surrounded by an air gap 11 into which an encircling convection barrier 12 extends. The honeycomb body 10 has a suspension or hanging device 13 which is formed at least in part of ceramic material. In this case, the honeycomb body 10 is secured to the heat accumulator 15, which is preferably made from a solid/solid phase change material. In order to provide thermal insulation, the heat shield 8 is constructed with a vacuum 16 which is disposed between the housing 2 and the heat accumulator 15.

The reformer installation for generating a hydrogen-rich product gas from a hydrocarbon-containing fluid, according to the invention, significantly improves cold-start performance as compared with known reformer installations. It is important to note that the preservation of generated heat, which has been generated during a preceding reforming operation, represents a method leading in a new direction as compared to conventionally operated reformer installations. This is advantageous in particular when a reformer installation of this type is used in the automotive industry, since reformer installations of this type have to be constantly reactivated at defined time intervals and the heat shield proposed prevents undesirable cooling during these intervals.

I claim:

1. A fuel cell installation, comprising:
    a reformer installation for generating a hydrogen-rich product gas from a hydrocarbon-containing fluid, said reformer installation including:
        a housing having an interior;
        at least one reformer zone disposed in said interior of said housing and having an operating temperature;
        at least one feed line leading to said housing; and
        a thermally insulating heat shield causing a reduction of said operating temperature in said at least one reformer zone by 20% to take at least 8 hours; and
    a fuel cell disposed downstream of said reformer installation.

2. The fuel cell installation according to claim 1, wherein said eat heat shield causes it to take at least 24 hours for said operating temperature in said at least one reformer zone to drop by 50%.

3. The fuel cell installation according to claim 1, wherein said heat shield causes it to take at least 24 hours for said operating temperature in said at least one reformer zone to drop by 20%.

4. The fuel cell installation according to claim 1, wherein said heat shield has a thermal conductivity of less than 35 W/mK.

5. The fuel cell installation according to claim 1, wherein said heat shield has a thermal conductivity of less than 12 W/mK.

6. The fuel cell installation according to claim 1, wherein said heat shield has a thermal conductivity of less than 5 W/mK.

7. The fuel cell installation according to claim 1, wherein said heat shield has an associated heat accumulator.

8. The fuel cell installation according to claim 7, wherein said heat accumulator is constructed with a phase change material.

9. The fuel cell installation according to claim 7, wherein said heat accumulator is disposed within said heat shield.

10. The fuel cell installation according to claim 1, wherein said heat shield has a vacuum.

11. The fuel cell installation according to claim 1, wherein said at least one reformer zone is a plurality of individual reformer zones, and said heat shield has different thermal conductivities at said individual reformer zones.

12. The fuel cell installation according to claim 11, wherein said plurality of individual reformer zones includes a first reformer zone for partial oxidation and a second reformer zone for steam reforming of a hydrocarbon-containing fluid, and said heat shield has a lower thermal conductivity in said second reformer zone than in said first reformer zone.

13. The fuel cell installation according to claim 12, wherein said plurality of individual reformer zones includes a third reformer zone for purification of the product gas, and said heat shield has a higher thermal conductivity in said third reformer zone than in said second reformer zone.

14. The fuel cell installation according to claim 13, wherein said heat shield has a lower thermal conductivity in said third reformer zone than in said first reformer zone.

15. The fuel cell installation according to claim 13, wherein said third reformer zone provides catalytic purification of the product gas.

16. The fuel cell installation according to claim 1, wherein said heat shield has an associated electric heater.

17. The fuel cell installation according to claim 1, wherein said at least one feed line has a heat shield.

18. The fuel cell installation according to claim 17, wherein said heat shield of said at least one feed line has a heat accumulator filled with phase change material.

19. The fuel cell installation according to claim 1, wherein said at least one feed line has an electric heater.

20. The fuel cell installation according to claim 1, which further comprises at least one honeycomb body being thermally decoupled from said housing and disposed in said interior of said housing.

21. The fuel cell installation according to claim 20, wherein said at least one honeycomb body is at least partially surrounded by an air gap.

22. The fuel cell installation according to claim 21, which further comprises at least one convection barrier extending into said air gap.

23. The fuel cell installation according to claim 20, wherein said at least one honeycomb body has at least one suspension device at least partly formed of ceramic material.

* * * * *